(12) United States Patent
Inoue

(10) Patent No.: US 11,039,032 B2
(45) Date of Patent: Jun. 15, 2021

(54) PRINTING APPARATUS EXECUTABLE OF CONDENSATION REMOVAL PROCESSING, METHOD OF CONTROLLING PRINTING APPARATUS, AND STORAGE MEDIUM

(71) Applicant: CANON KABUSHIKI KAISHA, Tokyo (JP)

(72) Inventor: Yutaka Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/392,292

(22) Filed: Apr. 23, 2019

(65) Prior Publication Data
US 2019/0335054 A1    Oct. 31, 2019

(30) Foreign Application Priority Data

Apr. 27, 2018  (JP) .............................. JP2018-086493

(51) Int. Cl.
*H04N 1/00*      (2006.01)
*G03G 15/20*     (2006.01)
*G03G 21/20*     (2006.01)

(52) U.S. Cl.
CPC ..... *H04N 1/00992* (2013.01); *H04N 1/00482* (2013.01); *H04N 1/00925* (2013.01); *H04N 1/00933* (2013.01); *G03G 15/2039* (2013.01); *G03G 21/20* (2013.01); *G03G 21/203* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2003/0111218 A1* | 6/2003 | Iguchi ................ | H04N 1/00127 165/200 |
| 2006/0001728 A1* | 1/2006 | Murakami .......... | B41J 2/04515 347/194 |
| 2012/0140287 A1* | 6/2012 | Kawaguchi ........ | G06K 15/1817 358/1.16 |
| 2016/0274522 A1* | 9/2016 | Yamamoto ......... | G03G 15/5045 |
| 2017/0257511 A1* | 9/2017 | Matsui ............... | H04N 1/00992 |

(Continued)

FOREIGN PATENT DOCUMENTS

JP    2018-023081 A    2/2018

OTHER PUBLICATIONS

"Image Forming Apparatus" published on Feb. 20, 2014 as US Pub 2014/0049579.*

*Primary Examiner* — Haris Sabah
(74) *Attorney, Agent, or Firm* — Canon U.S.A., Inc., IP Division

(57) ABSTRACT

An image forming apparatus includes an image forming device that forms an image on a sheet and executes predetermined image forming processing, a reception device that receives a user instruction, a sensor that acquires ambient temperature information, and at least one controller that prohibits execution of the predetermined image forming processing for a predetermined period if any of a plurality of conditions including a first condition and a second condition is satisfied, wherein the first condition is a condition that a plurality of pieces of temperature information acquired at a plurality of timings have a predetermined relationship and the second condition is a condition that a predetermined instruction is received.

11 Claims, 13 Drawing Sheets

(56) References Cited

U.S. PATENT DOCUMENTS

| | | | | |
|---|---|---|---|---|
| 2018/0027140 A1* | 1/2018 | Ikeda | ............... | H04N 1/00925 |
| | | | | 358/1.14 |
| 2018/0164728 A1* | 6/2018 | Mandachi | ............... | H04N 1/00 |
| 2019/0129358 A1* | 5/2019 | Hasegawa | ............ | G03G 21/203 |
| 2019/0171159 A1* | 6/2019 | Watanabe | .......... | G03G 15/5054 |
| 2019/0384220 A1* | 12/2019 | Nemoto | ............... | G03G 15/04 |

* cited by examiner

PRINTING APPARATUS EXECUTABLE OF CONDENSATION REMOVAL PROCESSING, METHOD OF CONTROLLING PRINTING APPARATUS, AND STORAGE MEDIUM

BACKGROUND

Field of the Invention

The present disclosure relates to a condensation removal process that involves restriction of execution of printing processing.

Description of the Related Art

A change in an environment in which an electrophotographic image forming apparatus is provided, e.g., a change in temperature around the apparatus, can cause condensation in the apparatus. Condensation in the apparatus can cause an error during image forming and a decrease in image quality of a formed image.

In response, Japanese Patent Application Laid-Open No. 2018-023081 discusses an image forming apparatus configured to start condensation removal processing if a change in environmental temperature that can cause condensation is detected in a case where a condensation prevention mode is enabled by a user. During the condensation removal processing, a fan is rotated for a predetermined period. Execution of printing processing is restricted during the condensation removal processing in order to prevent output of an image having low image quality due to an effect of condensation.

Possible cases where the user enables the condensation prevention mode are as follows. A first case is where condensation currently occurs and thus the user desires to start condensation removal processing such as immediate rotation of the fan. A second case is where immediate execution of condensation removal processing is not needed, but the user desires to start condensation removal processing if condensation occurs in the future due to a change in environmental temperature.

In the first case, condensation removal processing needs to be started at a timing when the user enables the condensation prevention mode.

In the second case, it is desirable, for user convenience, not to start condensation removal processing at a timing when the condensation prevention mode is enabled.

As previously described, execution of printing processing is restricted during condensation removal processing in order to prevent output of an image having low image quality due to an effect of condensation, as described in Japanese Patent Application Laid-Open No. 2018-023081. In the second case, if the condensation removal processing is started while no condensation occurs at a timing when the condensation prevention mode is enabled, execution of printing processing is restricted for a predetermined period. Thus, if the condensation removal processing is started at a timing when the condensation prevention mode is enabled, user convenience can be decreased.

Accordingly, there is a case where the user desires to start condensation removal processing that involves restriction of execution of printing processing if condensation occurs in the future, and a case where the user desires to immediately remove currently-occurring condensation. The conventional technique is not flexible enough to respond to each case.

SUMMARY

The present disclosure is directed to a technique for increasing convenience of a printing apparatus by enabling a flexible setting that relates to restriction of printing.

According to an aspect of the present disclosure, an image forming apparatus includes an image forming device configured to form an image on a sheet and configured to execute predetermined image forming processing, a reception device that receives an instruction, a sensor that acquires temperature information, and at least one controller prohibits execution of the predetermined image forming processing for a predetermined period if any of a plurality of conditions including a first condition and a second condition is satisfied, wherein the first condition is a condition that a plurality of pieces of temperature information acquired at a plurality of timings by the sensor have predetermined relationship and the second condition is a condition that the reception device receives a predetermined instruction.

Further features will become apparent from the following description of exemplary embodiments with reference to the attached drawings.

DESCRIPTION OF THE EMBODIMENTS

An exemplary embodiment will be described in detail below with reference to the drawings. The below-described exemplary embodiment is not seen to be limiting, and not every combination of features described in the exemplary embodiment is necessarily essential to the technical solution.

Figure 1:
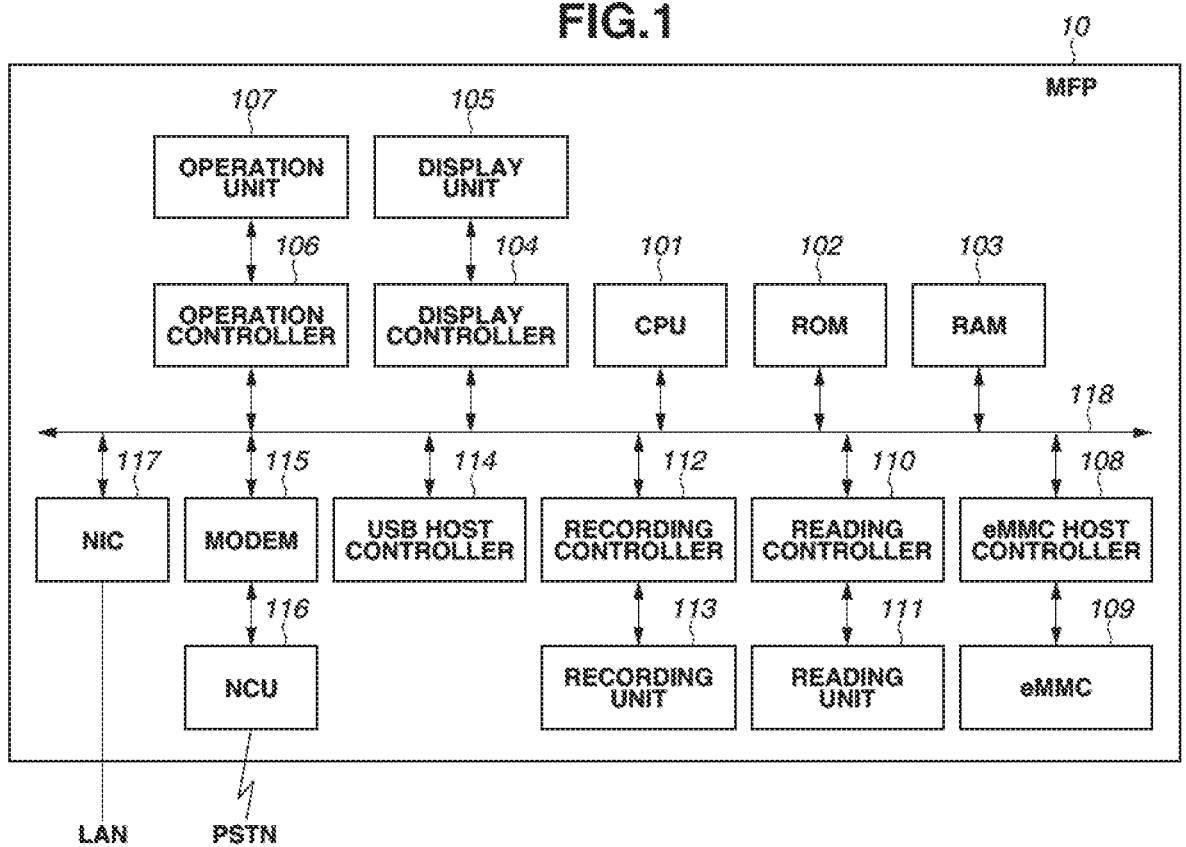
FIG. 1 is a block diagram illustrating a hardware configuration of a multi-function peripheral (MFP) according to a first exemplary embodiment.

A hardware configuration of a multi-function peripheral (MFP) 10 according to a first exemplary embodiment will be described with reference to a block diagram illustrated in FIG. 1. The MFP 10 according to the present exemplary embodiment is an image forming apparatus (printing apparatus) including a print function and a fax function. In another exemplary embodiment, t the image forming apparatus is a single-function printer (SFP) including only the print function.

A central processing unit (CPU) 101 comprehensively controls each device connected to a system bus 118. If power is supplied, the CPU 101 executes a boot program stored in a read-only memory (ROM) 102. The CPU 101 executes the boot program, so that a main program stored in a storage is loaded onto a random access memory (RAM) 103. The RAM 103 functions as not only a loading location of the main program but also a work area for the main program.

A display controller 104 controls drawing at a display unit 105. Further, an operation controller 106 controls input from an operation unit 107 of the MFP 10. The operation unit 107 includes numeric keys, a cursor key, and a one-touch key.

A reading unit 111 reads a document. The reading unit 111 is connected a reading controller 110, and the CPU 101 communicates with the reading unit 111 via the reading controller 110.

Further, a recording unit 113 forms an image on a recording sheet using an electrophotographic method. The recording unit 113 will be described below. The recording unit 113 is connected to a recording controller 112, and the CPU 101 communicates with the recording unit 113 via the recording controller 112.

A universal serial bus (USB) host controller 114 performs USB protocol control and mediates access to a USB device such as a USB memory (not illustrated).

A modem 115 modulates and demodulates a signal necessary for fax communication. Furthermore, the modem 115 is connected to a network control unit (NCU) 116. The signal modulated by the modem 115 is transmitted to a public switched telephone network (PSTN) via the NCU 116.

A network interface card (NIC) 117 bidirectionally exchanges data with a mail server and a file server via a local area network (LAN).

The MFP 10 according to the present exemplary embodiment includes an embedded multi-media card (eMMC) 109 as a storage. The CPU 101 accesses the eMMC 109 via an eMMC host controller 108. The storage is not limited to the eMMC, and a hard disk drive (HDD) or a solid state drive (SSD) can be used as the storage.

Figure 2:
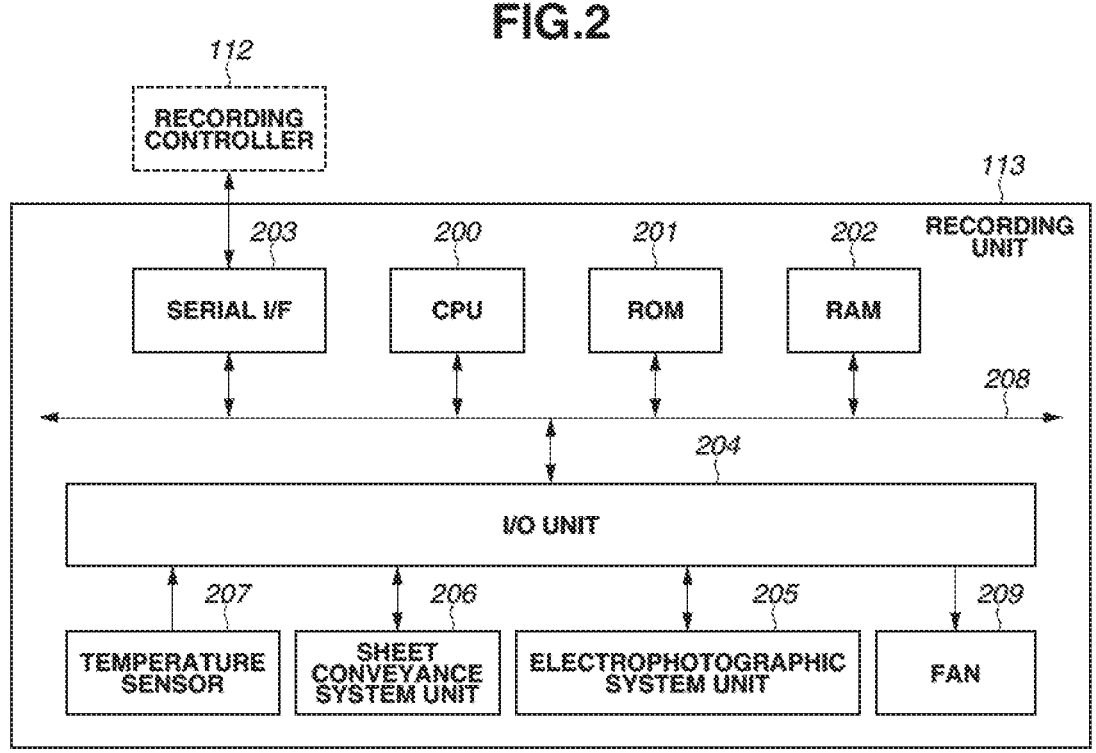
FIG. 2 is a block diagram illustrating a hardware configuration of a recording unit according to the first exemplary embodiment.

Next, a hardware configuration of the recording unit 113 according to the present exemplary embodiment will be described with reference to a block diagram illustrated in FIG. 2.

If power is supplied, a CPU 200 executes a control program stored in a ROM 201. A RAM 202 functions as a work area for the control program. Further, the CPU 200 receives, via a serial interface (I/F) 203, various instructions given by the main program of the MFP 10. Then, the CPU 200 controls, via an input/output (I/O) unit 204 connected to a system bus 208, an electrophotographic system unit 205 and a sheet conveyance system unit 206 based on the received various instructions. Furthermore, the CPU 200 acquires, via the I/O unit 204, a result of temperature measurement by a temperature sensor 207. A fan 209 is rotated to promote removal of condensation in a case where an instruction to execute condensation removal processing is given. A heater instead of the fan 209 can be used for condensation removal processing. There can be a configuration that does not include the fan 209, depending on the device. Specifically, processing whereby a condensation state is naturally solved by waiting for a predetermined period can be performed as condensation removal processing. In the case of performing such processing, printing processing is restricted as described below during the condensation removal processing.

Figure 3:
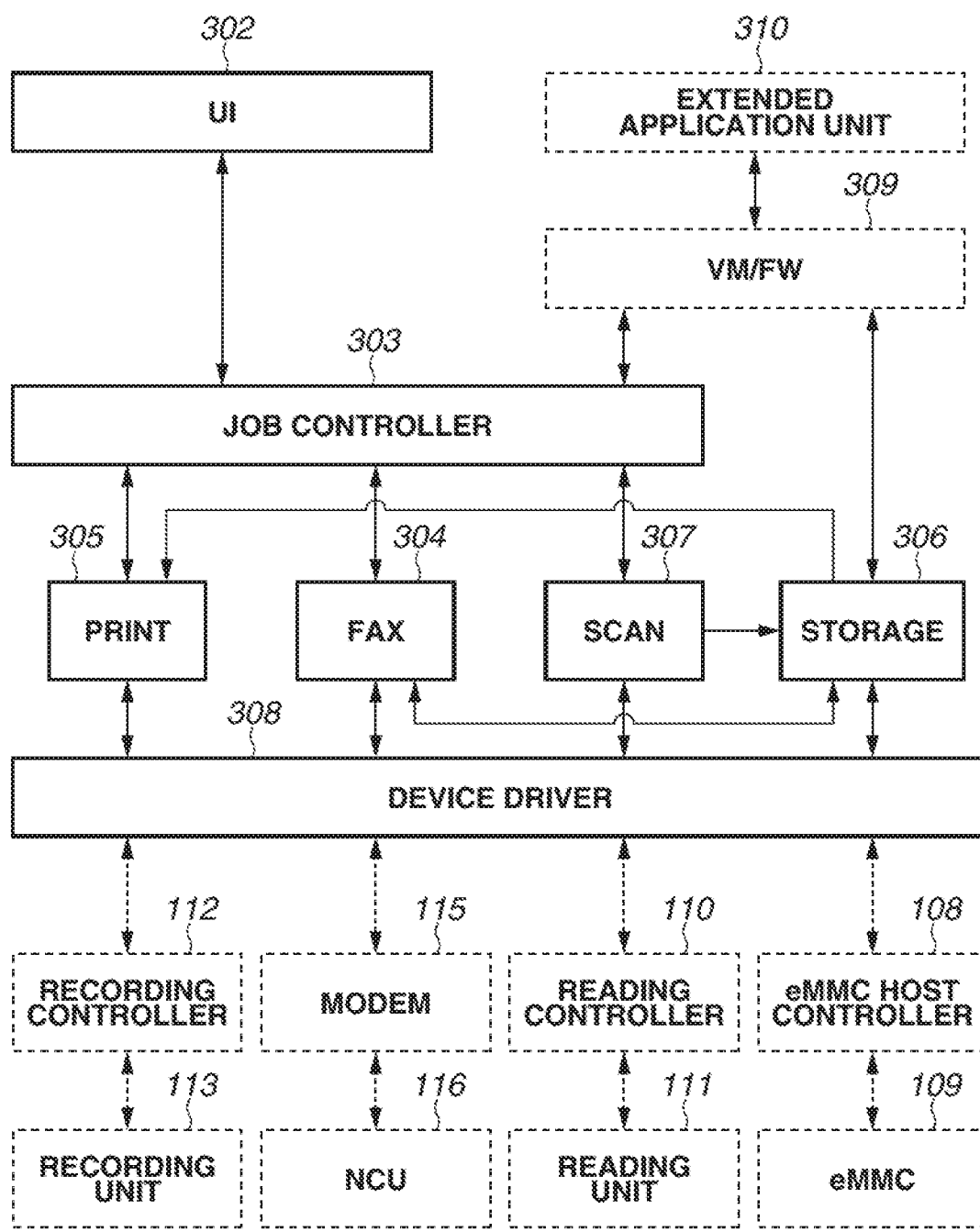
FIG. 3 is a diagram illustrating a software configuration of the MFP according to the first exemplary embodiment.

Next, a software configuration of the MFP 10 according to the present exemplary embodiment will be described below with reference to FIG. 3. Each unit specified by a solid line in FIG. 3 is a software module that is realized by the CPU 101 by executing the main program loaded onto the RAM 103 by the boot program.

Execution of each module of the main program is managed and controlled by an operating system (OS) (not illustrated). A device driver unit 308 is embedded in the OS and mediates communication with a hardware device such as the recording controller 112 or the modem 115.

A user interface (UI) unit 302 provides various types of information to a user via the display unit 105 and the operation unit 107 and receives various instructions from the user. The display unit 105 includes a touch panel and can be configured to receive operation instructions from the user.

A job controller unit 303 receives a job such as a copy job, print job, or fax job and controls execution of the received job.

A storage unit 306 is a software module configured to transmit a fax or physically store and manage data such as a received fax image or user settings in the eMMC 109.

For example, if a job controller unit 303 of the MFP 10 according to the present exemplary embodiment receives a fax job, a scan unit 307 receives the job request, controls the reading unit 111, and scans a document. Then, the scanned fax image data is stored in the storage unit 306. The fax image data stored in the storage unit 306 is read by a fax unit 304 and fax-transmitted to a destination via the modem 115 and the NCU 116. Alternatively, image data that is fax-transmitted from the destination via the modem 115 and the NCU 116 is acquired by the fax unit 304 and stored in the storage unit 306.

A print unit 305 transmits various predetermined instructions to the recording unit 113 via the recording controller 112, receives a state of the recording unit 113, and controls operations of the recording unit 113. For example, in a case of printing a fax-received image, after a print instruction is transmitted to the recording unit 113, an image file stored in the storage unit 306 is read, and image data contained in the image file is transferred to the recording unit 113.

The MFP 10 according to the present exemplary embodiment includes a virtual machine (VM)/frame work (FW) unit 309. An extended application unit 310 is formed by a program described in a script language.

Figure 4:
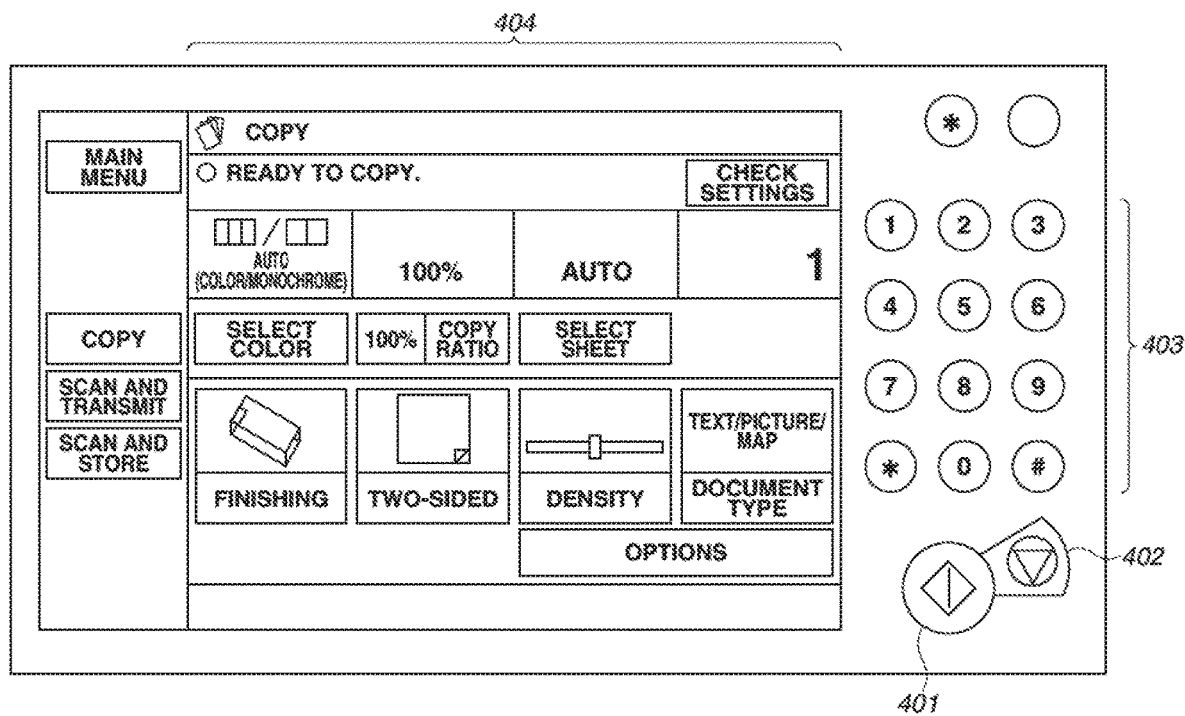
FIG. 4 illustrates an example of a layout configuration of an operation unit according to the first exemplary embodiment.

Next, an example of a configuration of the operation unit 107 according to the present exemplary embodiment will be described with reference to FIG. 4.

A start key 401 is a key for receiving an instruction to start printing processing. A clear/stop key 402 functions as a clear key while the apparatus is in a stand-by state, whereas the clear/stop key 402 functions as a stop key while a job is executed. Numeric keys 403 are keys used by the user to input a number. A region 404 is a region for displaying a screen via which the user can set various settings to the MFP 10 in order to execute copying or fax transmission.

Next, a process relating to condensation prevention processing according to the present exemplary embodiment will be described with reference to FIGS. 5 to 13.

Process of Condensation Prevention Processing

First, a process of condensation prevention processing according to the present exemplary embodiment will be described with reference to FIG. 13. The process of condensation prevention processing is performed in a case where a condensation prevention mode is enabled.

Figure 13:
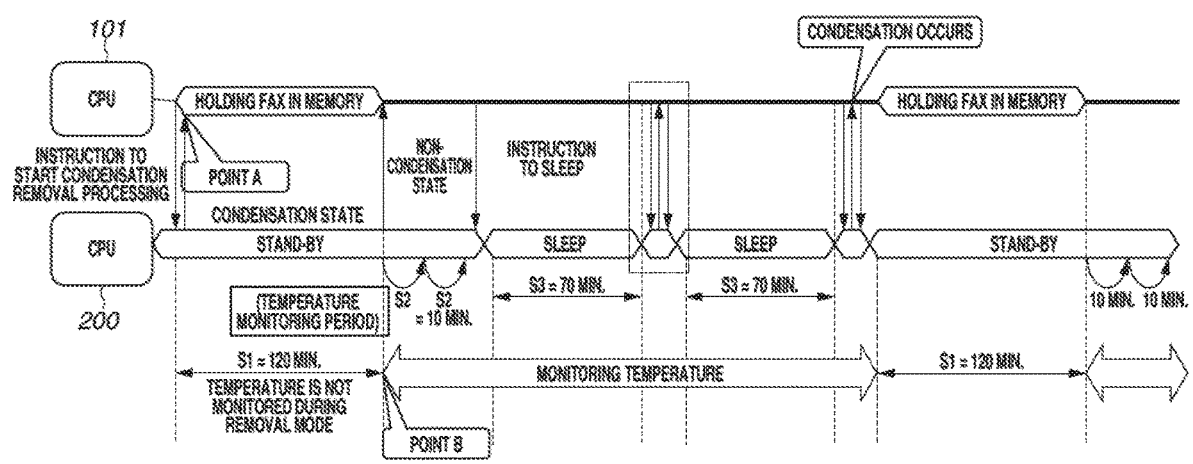
FIG. 13 illustrates a condensation prevention sequence according to the first exemplary embodiment.

In FIG. 13, the horizontal axis represents a time axis. An upper portion of FIG. 13 represents the CPU 101 of the MFP 10, whereas a lower portion of FIG. 13 represents the CPU 200 of the recording unit 113. In the example illustrated in FIG. 13, a process from a time point when the condensation removal processing is started is described. In the present exemplary embodiment, condensation removal processing is started if, for example, an instruction to immediately start condensation removal processing is given after an instruction to enable the condensation prevention mode is given. Further, in the present exemplary embodiment, condensation removal processing is started if an environmental change that satisfies a predetermined condensation occurrence condition is detected in a state where the condensation prevention mode is enabled but condensation removal processing is not executed.

If condensation removal processing is started, the CPU 101 performs control to change the MFP 10 to a fax memory holding state. The fax memory holding state refers to a state where received fax data is not printed and is held in a memory. In the fax memory holding state, fax data printing processing is restricted.

Furthermore, if condensation removal processing is started, the CPU 200 starts condensation removal processing. The condensation removal processing refers to, for example, the processing of removing condensation by rotating the fan 209 and/or turning on the heater. Alternatively, the condensation removal processing can be the processing of waiting for a predetermined period that is long enough for the condensation to be removed without using the fan 209 and the heater. In the example illustrated in FIG. 13, the condensation removal processing is continued for 120 minutes from the start.

If the condensation removal processing is completed, the CPU 200 transmits a notification of the state where the condensation is removed to the CPU 101. If the CPU 101 receives the notification from the CPU 200, the CPU 101 cancels the fax memory holding state.

Further, if the condensation removal processing is completed, the CPU 200 periodically (e.g., every 10 minutes) measures the environmental temperature. The environmental temperature refers to, for example, the temperature in a housing of the MFP 10. The CPU 200 can determine whether there is an environmental change that can cause condensation based on the measurement result. Details of the determination processing will be described below with reference to FIG. 9.

The environmental temperature is periodically measured at longer intervals (e.g., every 70 minutes) than a normal state (stand-by state) also in a case where the MFP 10 is changed to a sleep state.

If CPU 200 determines that there is an environmental change that can cause condensation based on the measurement result of the environmental temperature, the MFP 10 is returned from the sleep state, and the CPU 101 changes the MFP 10 to the fax memory holding state again. The CPU 200 starts condensation removal processing.

Condensation Prevention Mode Setting Processing

Next, the condensation prevention mode setting processing will be described. The user can make the setting to enable the condensation prevention mode by operating the operation unit 107. The condensation prevention mode refers to a mode in which the condensation determination processing in which the MFP 10 determines whether condensation occurs and the condensation removal processing of removing condensation are executed. The condensation removal processing refers to, for example, the processing of removing condensation by rotating the fan 209 and/or turning on the heater. Alternatively, the condensation removal processing can be the processing of waiting for a predetermined period that is long enough for the condensation to be removed without using the fan 209 and the heater.

Figure 8:
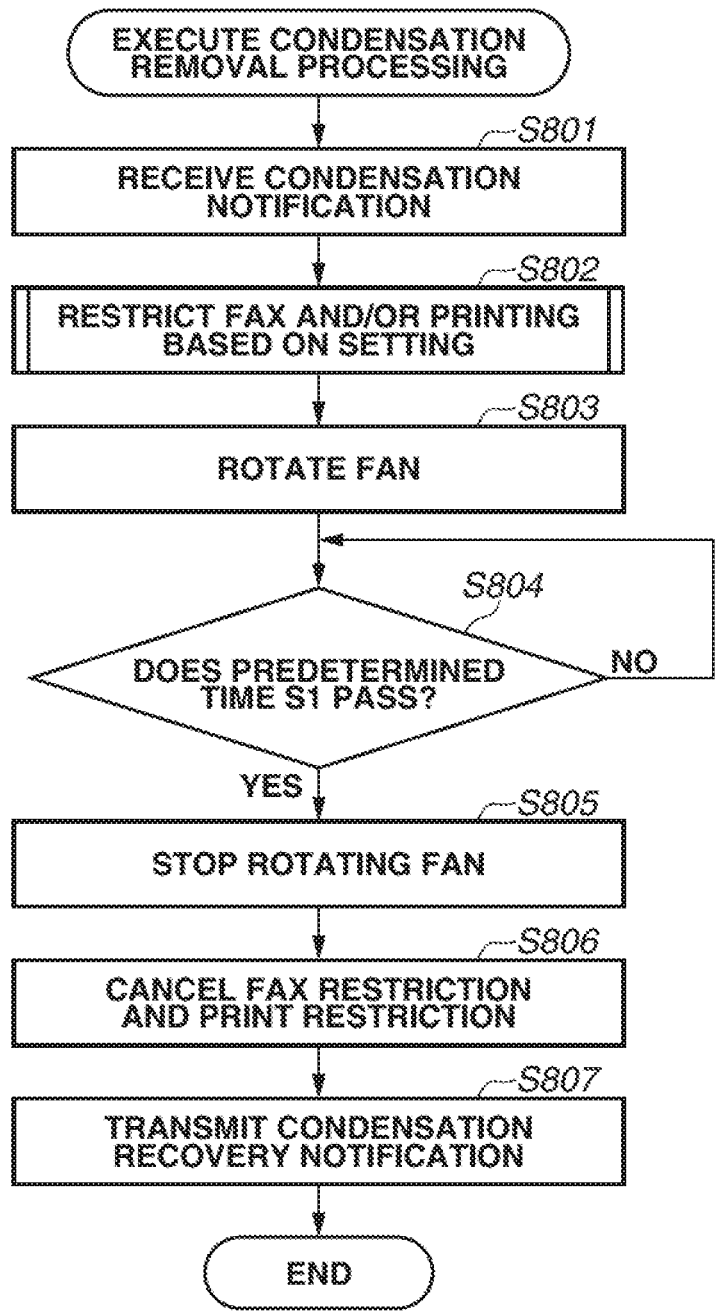
FIG. 8 is a flowchart illustrating a condensation removal process according to the first exemplary embodiment.
Figure 9:
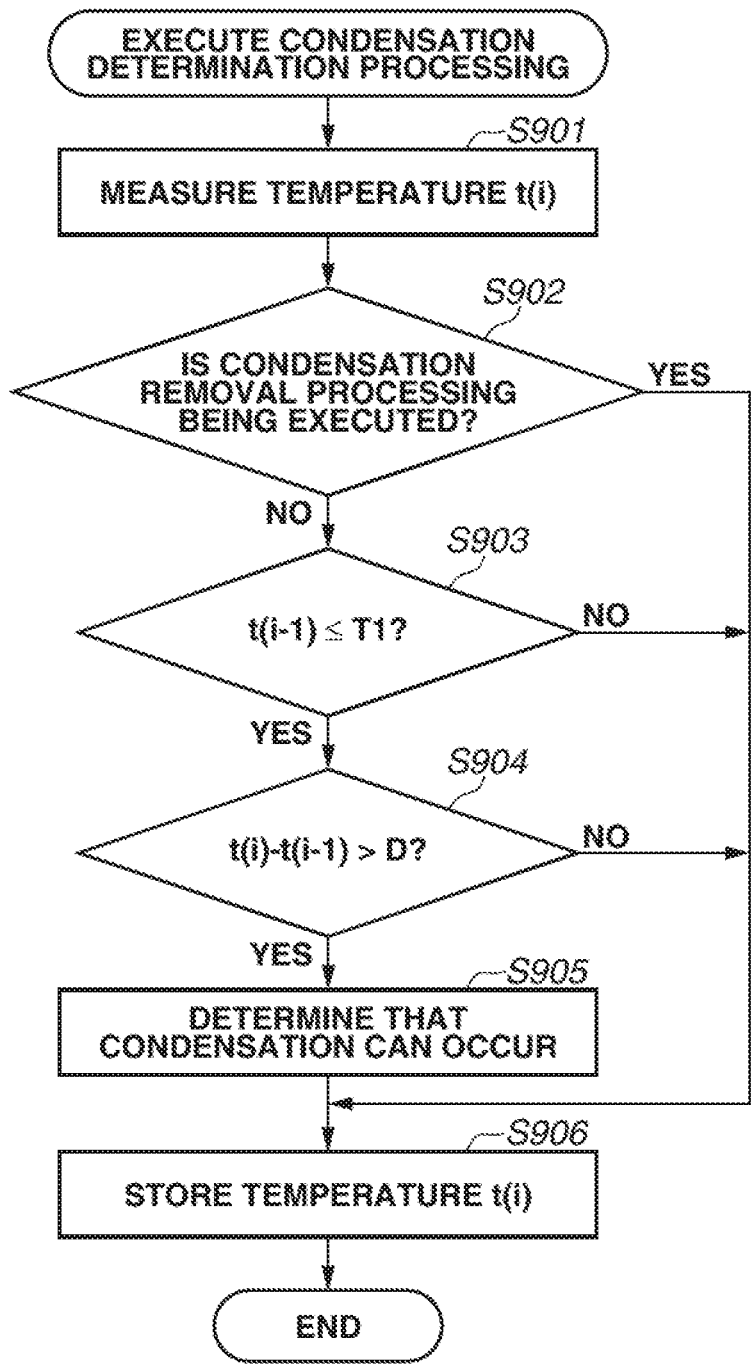
FIG. 9 is a flowchart illustrating a condensation determination process according to the first exemplary embodiment.
Figure 10:
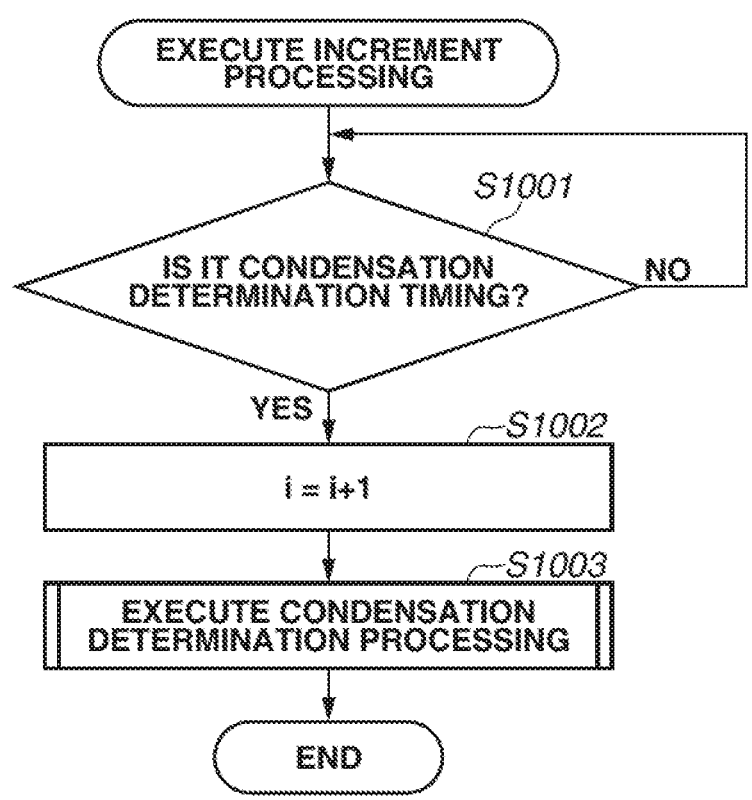
FIG. 10 is a flowchart illustrating an incrementing process relating to the condensation determination according to the first exemplary embodiment.

Details of the condensation determination processing will be described below with reference to FIGS. 9 to 11. Further, details of the condensation removal processing will be described below with reference to FIG. 8.

In the present exemplary embodiment, the user can set whether to enable or disable the condensation prevention mode. Furthermore, the user can select whether to start execution from the condensation removal processing or from the condensation determination processing in the case of enabling the condensation prevention mode. Only an administrator user authenticated using a user identification (ID) and a password can be allowed to set the settings.

While the condensation removal processing is executed, removal of condensation can be insufficient, so that the print quality can decrease. If the user desires to maintain the print quality, the user can enable a printing restriction mode in which execution of a print job received during execution of condensation removal processing is restricted until the condensation removal processing is completed. Further, if the user desires to enable execution of printing during execution of condensation removal processing even if the print quality decreases, the user can disable restriction of printing during execution of condensation removal processing.

In the present exemplary embodiment, fax data received during execution of condensation removal processing in the case where the condensation prevention mode is enabled is held in a memory such as the RAM 103, and printing of the fax data is restricted until the condensation removal processing is completed. Unlike a print job, fax data is difficult to re-input in a case where printing is unsuccessful, because in order to re-input fax data, it is necessary to request the sender of the fax to re-transmit the data. Thus, output of fax data is restricted during execution of condensation removal processing which can decrease the print quality, and the fax data held in the memory is printed after the condensation removal processing is completed. In this way, in the case where it is determined that condensation can occur and condensation removal processing is started, printing of received fax data is restricted.

Even if the printing restriction mode is disabled, printing of fax data is restricted as the condensation removal processing is started. As described above, the MFP 10 according to the present exemplary embodiment performs processing to restrict execution (including printing of fax data) of printing processing in the case of starting condensation removal processing.

First, the user operates the operation unit 107 so that a condensation prevention mode setting screen is displayed.

The user can enable or disable the condensation prevention mode via the setting screen. Further, the user can set whether to enable the printing restriction mode in the case where the condensation prevention mode is enabled. For example, if the user selects the setting to enable or disable the condensation prevention mode and the setting to enable or disable the printing restriction mode and then presses a setting confirmation button, the selected settings are enabled.

Figure 12A:
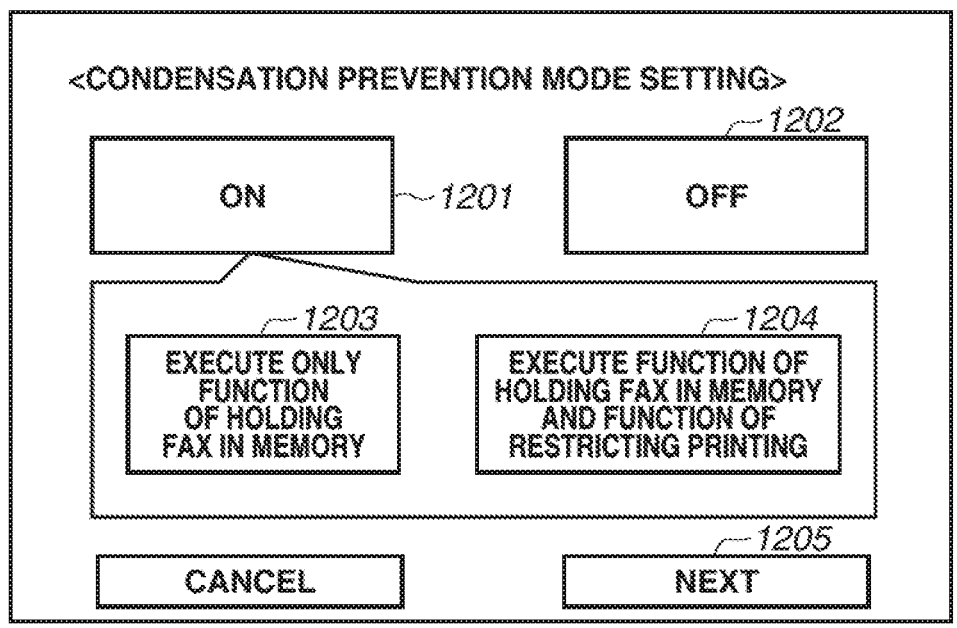
FIGS. 12A and 12B illustrate an operation unit for a condensation prevention setting according to the first exemplary embodiment.

FIG. 12A illustrates an example of the setting screen. A button 1201 is a button for enabling the condensation prevention mode. A button 1202 is a button for disabling the condensation prevention mode. The user can set whether to enable execution of condensation prevention processing using the button 1201 or 1202. The condensation prevention processing includes condensation determination processing, condensation removal processing, and printing restriction processing, which will be described below.

A button 1203 is a button for making a setting in which only a function of holding received fax data in the memory is executed and a function of restricting execution of a print job is not executed during execution of condensation removal processing. A button 1204 is a button for making a setting in which the function of holding received fax data in the memory is executed and execution of a print job is suspended during execution of condensation removal processing.

The buttons 1203 and 1204 can be configured to become operable if the button 1201 is selected. For example, the buttons 1203 and 1204 can be hidden or grayed out so that the buttons 1203 and 1204 are not selectable until the button 1201 is operated to enable the condensation prevention mode. Alternatively, the buttons 1203 and 1204 may be made settable independently of whether the button 1201 is selected.

A button 1205 is a button for confirming the settings made on the setting screen. The setting screen illustrated in FIG. 12A is a mere example, and the setting screen is not limited to the setting screen illustrated in FIG. 12A. Alternatively, each setting can be enabled or disabled via not the button but a checkbox or pull-down menu.

Figure 11:
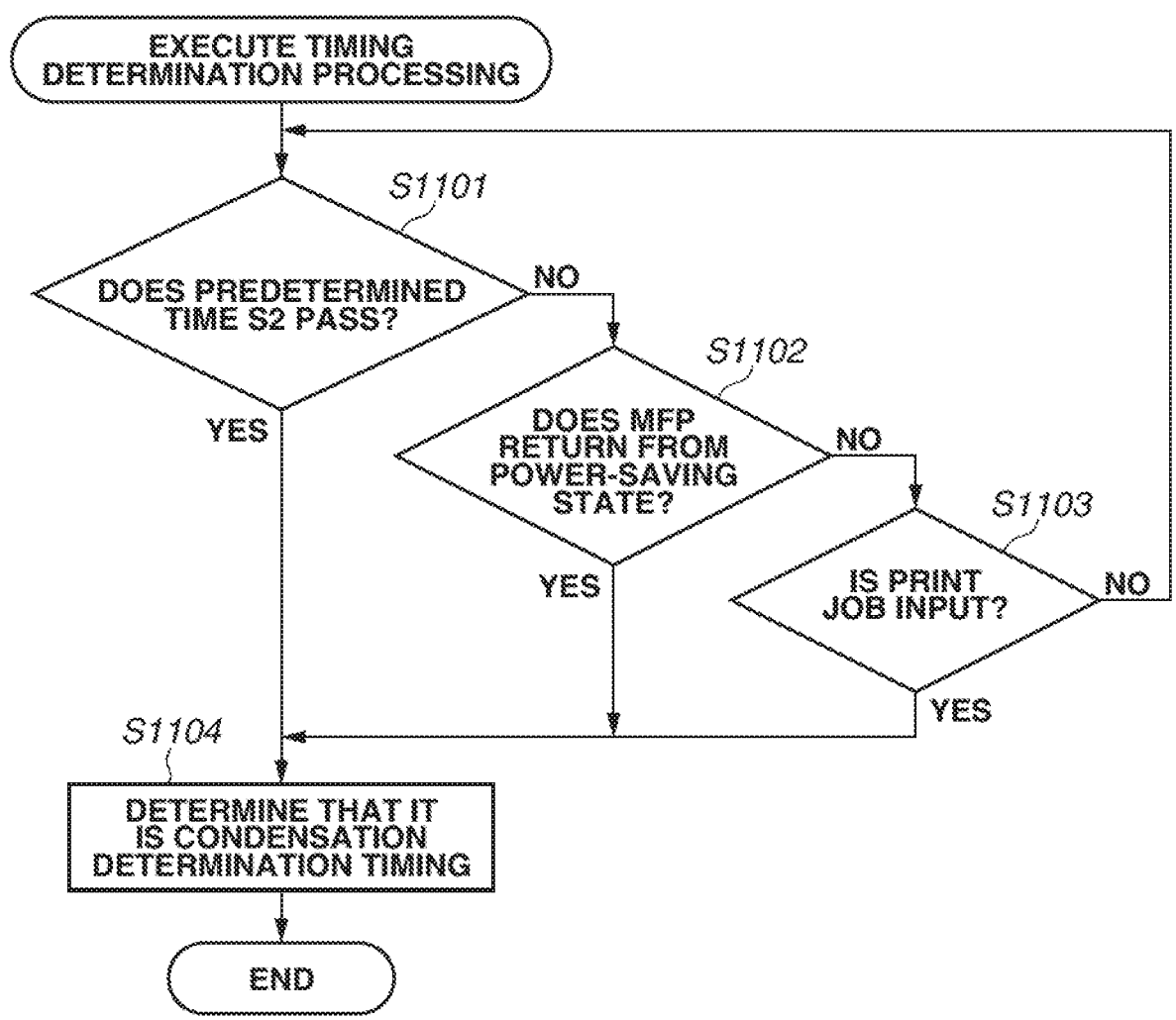
FIG. 11 is a flowchart illustrating a process of determining a condensation determination timing according to the first exemplary embodiment.
Figure 12B:
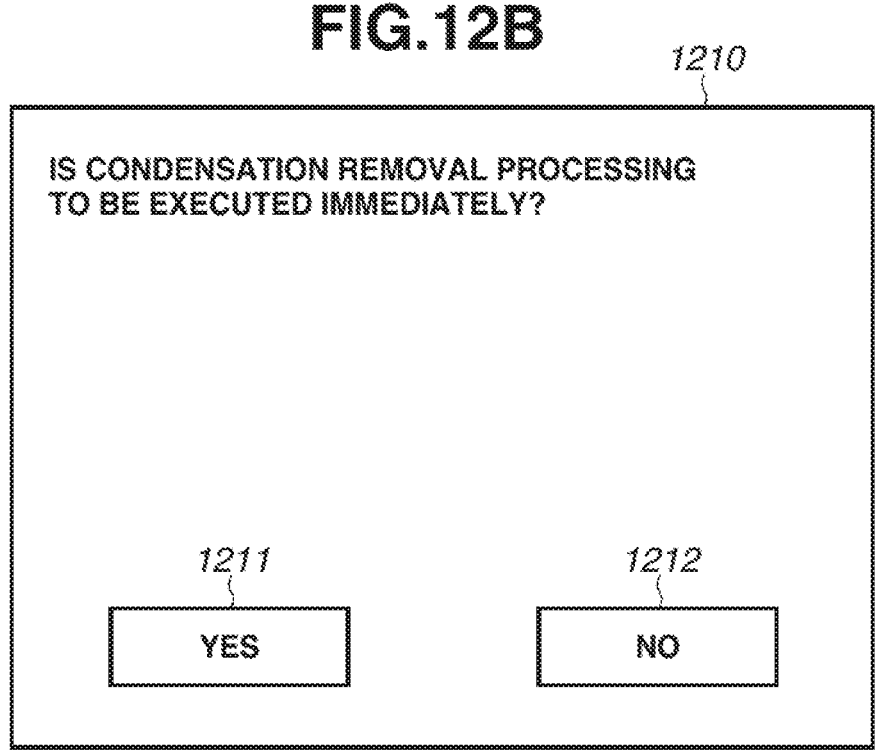

Further, if the button 1205 is pressed, the screen is changed to a setting screen 1210 illustrated in FIG. 12B, and the user selects whether to immediately execute condensation removal processing. If an "YES" button 1211 in FIG. 12B is pressed, the CPU 101 starts condensation removal processing (FIG. 8). If a "NO" button 1212 is pressed, the CPU 101 starts condensation determination processing (FIGS. 9 to 11).

The setting method is not limited to that illustrated in FIG. 12B. For example, the setting can be configured to be made regardless of whether the condensation prevention mode is enabled using the button 1201. For example, the setting "to start condensation removal processing if the condensation removal processing is enabled" can be configured to be made independently of the setting "to enable the condensation removal processing". Alternatively, the setting "not to start condensation removal processing until condensation is detected even if the condensation removal processing is enabled" can be configured to be made independently of the setting "to enable the condensation removal processing".

As described above, if the condensation removal processing is performed, the restriction processing is started to restrict at least printing of fax data. Specifically, an instruction as to whether to start condensation removal processing corresponds to an instruction as to whether to start printing restriction processing.

Specifically, a user instruction via the setting screen illustrated in FIG. 12B corresponds to the instruction as to whether to start printing restriction processing. Thus, in the present exemplary embodiment, the user can issue an instruction as to whether to start printing restriction processing if the setting to enable the condensation prevention processing is made.

An instruction to immediately execute condensation removal processing corresponds to a first instruction to start printing restriction processing if the setting to enable the condensation prevention processing is made. An instruction not to immediately execute condensation removal processing corresponds to a second instruction to start printing restriction processing in the case where the setting to enable the condensation prevention processing is made and the MFP 10 determines that condensation can occur. The MFP 10 selectively sets the first and second instructions according to a user instruction.

Details of the setting processing will be described with reference to FIG. 5. The CPU 101 reads a program stored in the ROM 102 onto the RAM 103 and executes the program to realize the process illustrated in FIG. 5. Alternatively, part of the process can be realized by hardware such as a circuit.

In step S501, the CPU 101 receives setting content via the operation controller 106. For example, the CPU 101 receives the setting content at the timing when the "YES" button 1211 or the "NO" button 1212 in FIG. 12B is pressed.

In step S502, the CPU 101 determines whether the setting to enable the condensation prevention mode is made. If the setting to enable the condensation prevention mode is not made (NO in step S502), then in step S506, the CPU 101 stores in the eMMC 109 information indicating that the condensation prevention mode is disabled, and the process ends.

If the setting to enable the condensation prevention mode is made (YES in step S502), then in step S503, the CPU 101 determines whether the printing restriction mode is enabled. As described above, the printing restriction mode is a mode in which execution of printing of print data input from a personal computer by a user is restricted while the condensation removal processing is executed.

If the printing restriction mode is enabled (YES in step S503), then in step S504, the CPU 101 stores in the eMMC 109 information indicating that the condensation prevention mode is enabled and that the printing restriction mode is enabled. In the present exemplary embodiment, if the condensation prevention mode is enabled, the fax data memory holding function is also automatically enabled. Thus, in step S504, information indicating that the condensation prevention mode is enabled, that the fax data memory holding function is enabled, and that the printing restriction function is enabled is stored in the eMMC 109.

If the printing restriction mode is not enabled (NO in step S503), then in step S505, information indicating that the condensation prevention mode is enabled is stored in the eMMC 109 and information indicating that the printing restriction mode is not enabled is stored. As in step S504, if the condensation prevention mode is enabled, the fax data memory holding function is also automatically enabled. Thus, in step S505, information indicating that the condensation prevention mode is enabled and that the fax data memory holding function is enabled is stored in the eMMC 109.

If the processing in step S504 or S505 is completed, then in step S507, the CPU 101 determines whether to immediately start condensation removal processing. The CPU 101 determines whether to immediately start condensation removal processing based on the settings made via the screen in FIG. 12B. If an instruction to immediately start condensation removal processing is given, i.e., if the "YES" button 1211 in FIG. 12B is selected (YES in step S507), then in step S508, information indicating that an instruction to start from condensation removal processing is given is stored in the eMMC 109. If an instruction not to immediately start condensation removal processing is given, i.e., an instruction to start with condensation determination processing is given, i.e., if "NO" in FIG. 12B is selected (NO in step S507), then in step S509, information indicating that an instruction to start from condensation determination processing is given is stored in the eMMC 109.

Further, in step S510, a notification of the content stored in the eMMC 109 is transmitted to the recording controller 112. The recording controller 112 having received the content stores the received content RAM 202 in the recording controller 112.

Condensation Prevention Execution Processing

Figure 6:
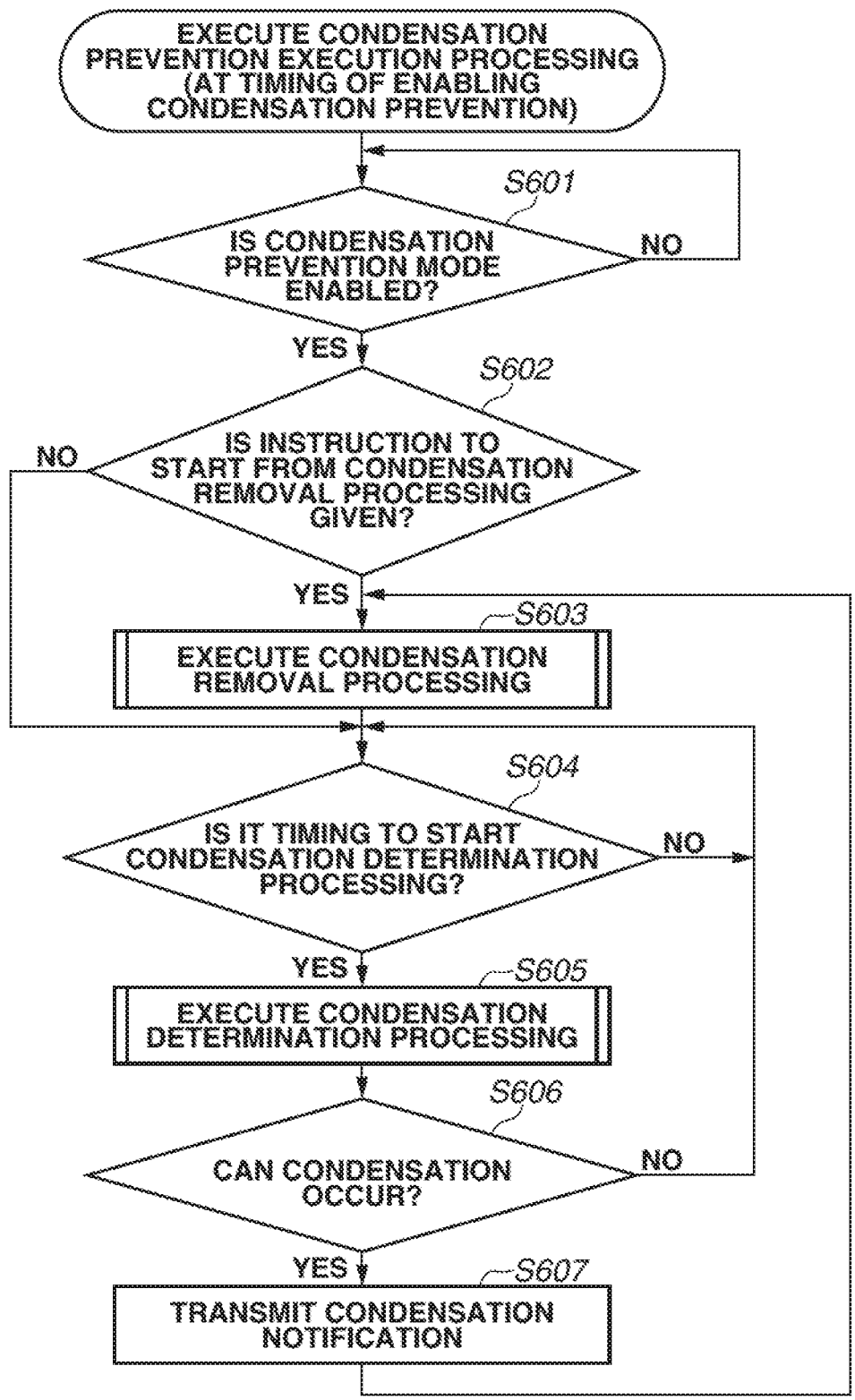
FIG. 6 is a flowchart illustrating a process of executing condensation prevention (at a time of enabling the condensation prevention mode) according to the first exemplary embodiment.

Next, condensation prevention execution processing will be described with reference to FIGS. 6 and 7. FIG. 6 is a flowchart illustrating a process of executing condensation prevention processing which is executed at a timing when the setting to enable the condensation prevention mode is made. Further, FIG. 7 is a flowchart illustrating a process of executing condensation prevention processing which is executed after the MFP 10 is turned on after the MFP 10 is turned off after it is determined to enable the condensation prevention mode.

Figure 7:
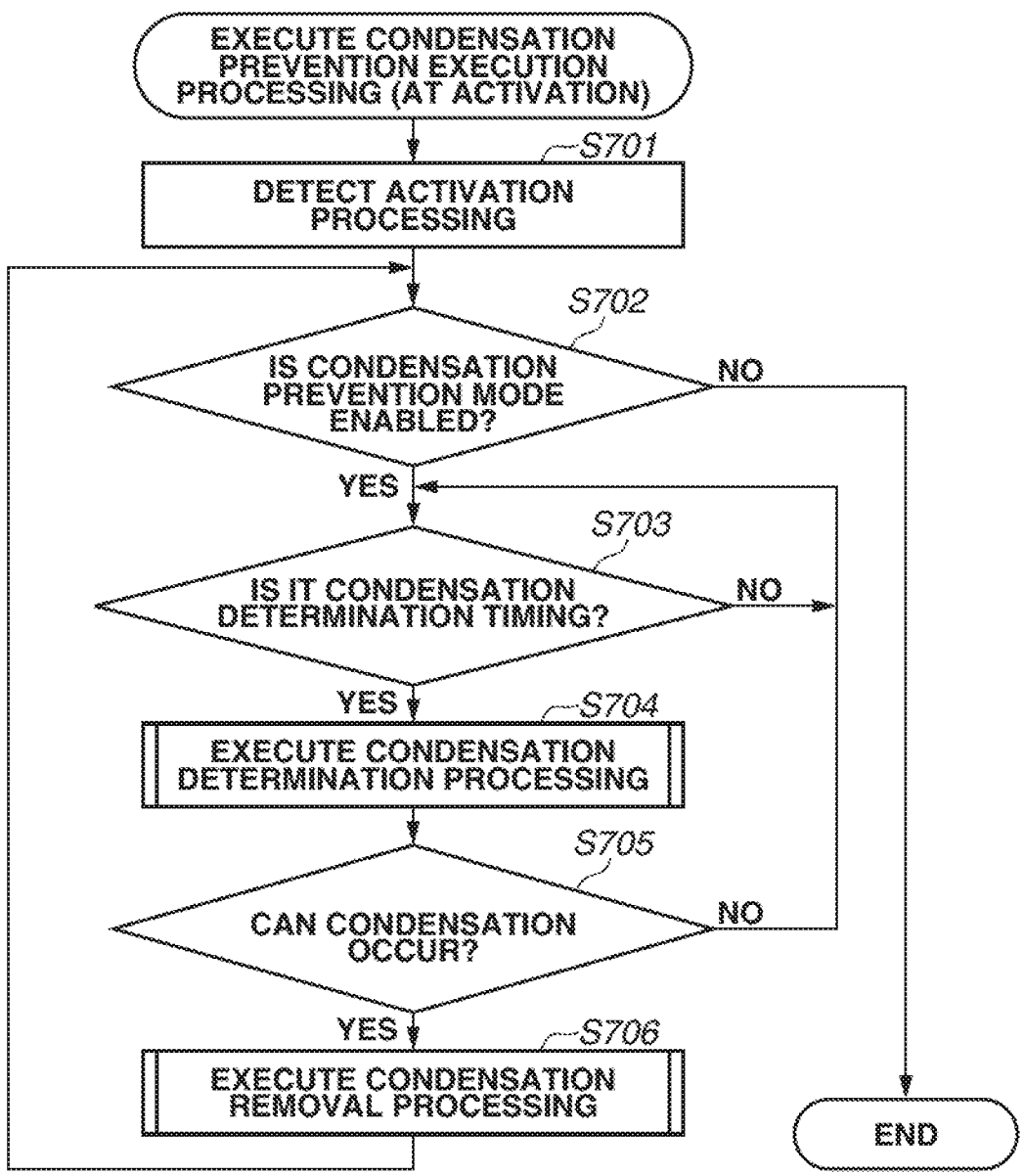
FIG. 7 is a flowchart illustrating a process of executing condensation prevention (at a time of activation) according to the first exemplary embodiment.

The CPU 200 develops a program read from the ROM 201 onto the RAM 202 and executes the program to thereby execute the processes illustrated in FIGS. 6 and 7. As described above, the notification of the setting content of the condensation prevention mode is transmitted to the recording controller 112 in step S510 in FIG. 5 and the content is stored in the RAM 202 of the recording controller 112, so that the CPU 200 reads the setting from the RAM 202 to check the setting.

First, the process illustrated in FIG. 6 will be described. In step S601, the CPU 200 determines whether the setting to enable the condensation prevention mode is made. The CPU 200 repeats the processing of step S601 until the setting to enable the condensation prevention mode is made.

If the setting to enable the condensation prevention mode is made (YES in step S601), then in step S602, the CPU 200 determines whether an instruction to start from condensation removal processing (from point A in FIG. 13) is given or an instruction to start from condensation determination processing (from point B in FIG. 13) is given.

If the CPU 200 determines that an instruction to start from condensation removal processing is given (YES in step S602), then in step S603, the CPU 200 starts condensation removal processing. Details of the condensation removal processing will be described below with reference to FIG. 8.

If the CPU 200 determines that an instruction to start from condensation determination processing is given (NO in step S602), then in step S604, the CPU 200 determines whether it is a timing to start condensation determination processing. If it is the determination timing (YES in step S604), then in step S605, the CPU 200 executes condensation determination processing. Details of the condensation determination processing will be described below with reference to FIG. 9.

Then, in step S606, the CPU 200 determines whether it is a situation where condensation can occur, based on a result of the condensation determination processing. If the CPU 200 determines that it is not a situation where condensation can occur (NO in step S606), the processing returns to step S604.

If the CPU 200 determines that it is a situation where condensation can occur (YES in step S606), then in step S607, the CPU 200 transmits a notification of the occurrence of the condensation state to the CPU 101, and the processing returns to step S603.

Figure 5:
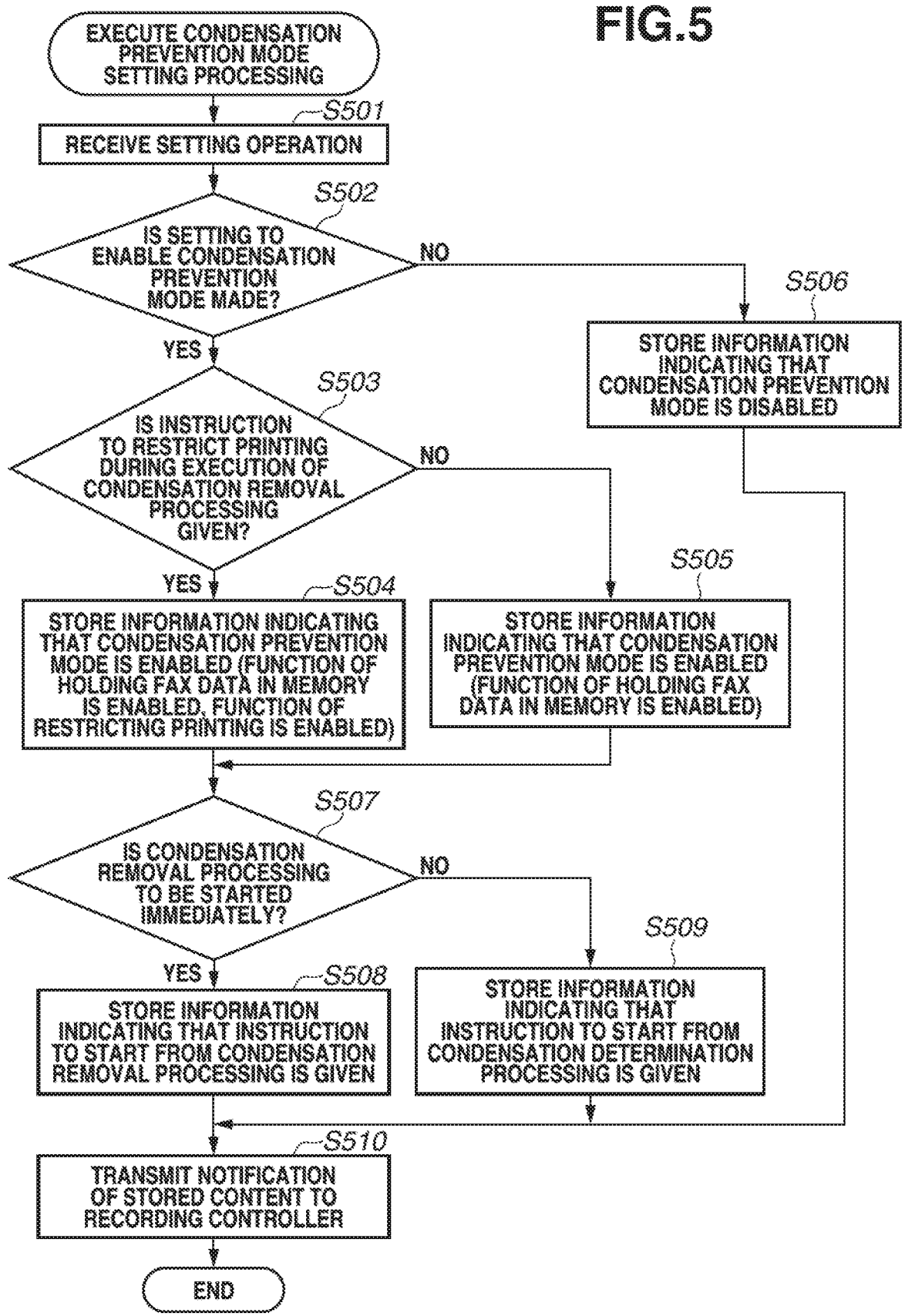
FIG. 5 is a flowchart illustrating a process of setting a condensation prevention mode according to the first exemplary embodiment.

The CPU 101 having received the notification of the occurrence of the condensation state performs control to operate the MFP 10 in the printing restriction mode based on the setting stored in step S504 or S505 in FIG. 5.

Processing at the Time of Activation

Next, a process in a case where the MFP 10 is activated in the state where the condensation prevention mode is enabled will be described with reference to FIG. 7. In the example illustrated in FIG. 6, the condensation removal processing is started immediately at the timing when the condensation prevention mode is enabled. In the example illustrated in FIG. 7, if the MFP 10 is activated, the CPU 101 first executes condensation determination processing, and after it is determined that it is a timing when condensation can occur, the CPU 101 starts condensation removal processing.

The CPU 200 loads a program read from the ROM 201 onto the RAM 202 and executes the program to thereby execute the process illustrated in FIG. 7.

The CPU 101 starts processing to activate the MFP 10 if a power switch is operated to give an instruction to turn on the power in a state where the MFP 10 is turned off in step S701, if the CPU 200 detects that activation processing is executed, the processing proceeds to step S702.

Next, in step S702, the CPU 200 determines whether the condensation prevention mode is enabled. The CPU 200 can determine whether the condensation prevention mode is enabled by, for example, checking the setting content of the condensation prevention mode that is set to the eMMC 109. If the condensation prevention mode is not enabled (NO in step S702), the process of executing condensation prevention ends.

If the condensation prevention mode is enabled (YES in step S702), then in step S703, the CPU 200 determines whether it is a condensation determination timing. If it is not the condensation determination timing (NO in step S703), the CPU 200 repeats step S703. If it is the condensation determination timing (YES in step S703), then in step S704, the CPU 200 executes condensation determination processing. Details of the condensation determination processing will be described below with reference to FIG. 9.

Then, in step S705, the CPU 200 determines whether condensation occurs, based on a result of the condensation determination processing. If the CPU 200 determines that condensation does not occur (NO in step S705), the processing returns to step S703. If the CPU 200 determines that condensation occurs (YES in step S705), then in step S706, the CPU 200 executes condensation removal processing. As described above, at least printing of fax data is restricted during condensation removal processing. Specifically, if the CPU 200 determines that it is a situation where condensation occurs, processing to restrict execution of printing processing is executed. If the condensation removal processing is completed, the processing returns to step S702.

Condensation Removal Processing

Next, the condensation removal processing will be described with reference to FIG. 8. The CPU 200 loads a program read from the ROM 201 onto the RAM 202 and executes the program to thereby execute the process illustrated in FIG. 8.

In step S801, a notification of condensation is received, and then in step S802, the program of condensation removal processing executed by the CPU 200 executes printing restriction processing to restrict a fax job or print job based on the setting stored in step S504 or S505 in FIG. 5. The recording unit 113 executes printing restriction processing based on the control by the CPU 101.

Then, in step S803, the CPU 200 rotates the fan 209. Instead of rotating the fan 209, the heater (not illustrated) can be turned on. Alternatively, the fan 209 and the heater can both be operated. If there is neither the fan nor the heater, the printer waits in the stand-by state.

Next, in step S804, the CPU 200 determines whether a predetermined time S1 passes from the start of the rotation of the fan 209 or while the printer is in the stand-by state. The CPU 200 repeats step S804 until the predetermined time S1 passes. If the predetermined time S1 passes (YES in step S804), then in step S805, the CPU 200 stops rotating the fan 209. Then, in step S806, the CPU 200 cancels the fax restriction and the printing restriction executed in step S802. In this way, the fax restriction and the printing restriction are cancelled after the predetermined time passes from the start of the restriction processing. If the restriction is cancelled, suspended printing processing and fax data printing are executed. Specifically, the printing processing is executed after the condensation removal processing is completed. Then, in step S807, the CPU 200 outputs a condensation recovery notification to the program executing condensation determination, and the process ends.

Condensation Determination Processing

Next, condensation determination processing will be described with reference to FIGS. 9 and 10. The CPU 200 loads a program read from the ROM 201 onto the RAM 202 and executes the program to thereby execute the processes illustrated in FIGS. 9 and 10. The condensation determination processing is started in the case where the CPU 101 determines that it is the timing to execute condensation determination. A process of determining the timing will be described below with reference to FIG. 11.

First, in step S901, the CPU 200 acquires a measured environmental temperature t(i) from the temperature sensor 207. In the present exemplary embodiment, the environmental temperature refers to the temperature in the housing of the MFP 10. The CPU 200 acquires the temperature measured by the temperature sensor 207 as the environmental temperature t(i).

Next, in step S902, the CPU 200 determines whether the condensation removal processing described above with reference to FIG. 8 is being executed. If the condensation removal processing is being executed (YES in step S902), the processing proceeds to step S906. If the condensation removal processing is not being executed (NO in step S902), the processing proceeds to step S903.

In step S903, the CPU 200 determines whether a previously-measured environmental temperature t(i−1) is not higher than a predetermined temperature T1. If the environmental temperature t(i−1) is not higher than the predetermined temperature T1 (YES in step S903), the processing proceeds to step S904. If the environmental temperature t(i−1) is higher than the predetermined temperature T1 (NO in step S903), the processing proceeds to step S906.

In step S904, the CPU 200 determines whether the difference between the environmental temperature t(i) and the environmental temperature t(i−1) measured before the predetermined time S1 is greater than a predetermined reference value D. If the difference is greater than the reference value D (YES in step S904), then in step S905, the CPU 200 determines that it is an environment in which condensation can occur. Specifically, the CPU 200 determines that it is a situation where condensation can occur. If the difference is not greater than the reference value D (NO in step S904), the CPU 200 executes step S906.

The case where the environmental temperature t(i−1) is not higher than the predetermined temperature T1 (YES in step S903) and t(i)−t(i−1) is greater than the reference value D (YES in step S904) indicates a rise in ambient temperature at a relatively low temperature. Since the humidity is expected to rise with the temperature, it can be determined that condensation can occur. In this way, the CPU 200 can determine whether it is a situation where condensation can occur in the MFP 10. If the CPU 200 determines that it is an environment in which condensation can occur, the condensation removal processing is started as described above with reference to FIGS. 6 and 7.

In step S906, the CPU 200 stores the environmental temperature t(i) acquired in step S901 in the RAM 202.

Next, a process of incrementing the environmental temperature t(i) will be described with reference to FIG. 10. In step S1001, the CPU 200 executes timing determination processing which will be described below with reference to FIG. 11. If the CPU 200 determines that it is not the condensation determination timing (NO in step S1001), the CPU 200 repeats step S1001.

If the CPU 200 determines that it is the condensation determination timing (YES in step S1001), then in step S1002, the CPU 200 increments the value of i of the environmental temperature t(i).

If the processing in step S1002 is completed, the processing proceeds to step S1003, and the CPU 200 executes condensation determination processing described above with reference to FIG. 9.

The above-described method is a mere example of a method for detecting a possibility that condensation occurs, and any other method can be used. For example, the humidity in the MFP 10 can be measured, and the condensation occurrence determination can be performed based on the detected humidity. Not only the temperature and humidity in the apparatus but also the temperature and humidity outside the apparatus can used in the determination.

Timing Determination Processing

Next, timing determination processing to determine whether it is a timing to execute condensation determination processing will be described with reference to FIG. 11. The CPU 200 loads a program read from the ROM 201 onto the RAM 202 and executes the program to thereby execute the process illustrated in FIG. 11.

In step S1101, the CPU 200 determines whether a predetermined time S2 passes from the previous execution of condensation determination processing. In a case of executing step S1101 for the first time after the MFP 10 is activated, the CPU 200 determines whether the predetermined time S2 passes from the time at which the MFP 10 is activated.

If the CPU 200 determines that the predetermined time S2 passes (YES in step S1101), then in step S1104, the CPU 200 determines that it is the condensation determination timing.

If the CPU 200 determines that the predetermined time S2 does not pass (NO in step S1101), then in step S1102, the CPU 200 determines whether the MFP 10 returns from the power-saving state. If the MFP 10 returns from the power-saving state (YES in step S1102), the processing proceeds to step S1104, and the CPU 200 determines that it is the condensation determination timing. If an event to return from the power-saving state does not occur (NO in step S1102), then in step S1103, the CPU 200 determines whether a print job is input. If an event to input a print job does not occur (NO step S1103), the processing returns to step S1101. If a print job is input (YES step S1103), the CPU 200 determines that it is the condensation determination timing.

In the above-described process, the CPU 200 determines that it is the condensation determination timing if the predetermined time S2 passes from the activation or the previous execution of condensation determination processing, if the MFP 10 returns from the power-saving state, and if a print job is received.

The determination method illustrated in FIG. 11 is a mere example, and the CPU 200 can determine that it is the condensation determination timing in a case where a factor other than those described above occurs.

The condensation prevention processing can be realized by the processes described above with reference to FIGS. 5 to 11. While the example has been described in which each process illustrated in FIGS. 5 and 11 is performed by the CPU 101 or the CPU 200, the executor is not limited to that described above in the example. The CPU 101 can execute the process described as a process to be executed by the CPU 200. Alternatively, the CPU 200 can execute the process described as a process to be executed by the CPU 101. The CPU 101 can execute part of one flowchart and the CPU 200 can execute the other part of the flowchart.

In the present exemplary embodiment, the user can set whether to immediately start condensation removal processing or to start condensation removal processing in a case where there is a predetermined environmental change, instead of immediately starting condensation removal processing, in the case of enabling the condensation prevention mode. For example, in the example illustrated in FIG. 13, the user can set whether to execute processing from the point A or from the point B in the case of enabling the condensation prevention mode.

For example, if the setting not to immediately start condensation removal processing is enabled, restriction of data output of a fax job or print job for a predetermined time although no condensation currently occurs because the condensation prevention mode is enabled is prevented.

Further, the condensation removal processing is promptly started in a case where, for example, condensation currently occurs.

In this way, the user can flexibly set, for each situation, the timing to start condensation removal processing which involves restriction of execution of printing processing in the case where the condensation prevention processing is enabled. This increases convenience of the image forming apparatus for the user.

Other Exemplary Embodiment

One or more functions of the above-described exemplary embodiment can be realized by a process where a program is supplied to a system or apparatus via a network or storage medium and one or more processors of a computer of the system or apparatus reads and executes the program. The one or more functions can also be realized by a circuit (e.g., application-specific integrated circuit (ASIC)).

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-086493, filed Apr. 27, 2018, which is hereby incorporated by reference herein in its entirety.

What is claimed is:

1. An image forming apparatus comprising:
   an image forming device configured to execute an image forming processing;
   a fan;
   a temperature sensor;
   one or more controllers configured to
   execute a condensation removal process that prohibits execution of a predetermined image forming processing and drives the fan for a predetermined period; and
   a reception device configured to be able to receive, as a user instruction from a user to decide timing to start the condensation removal process, a first user instruction from the user to execute the condensation removal process when the first user instruction is received and a second user instruction from the user to execute the condensation removal when the temperature information output by the sensor satisfies a predetermined condition.

2. The image forming apparatus according to claim 1, wherein the predetermined image forming processing is the image forming processing in which image forming based on fax data is started if the fax data is received.

3. The image forming apparatus according to claim 1, wherein the one or more controllers stores fax data received during the predetermined period.

4. The image forming apparatus according to claim 3, wherein the one or more controllers causes the image forming device to execute image forming based on the stored fax data if the predetermined period ends.

5. The image forming apparatus according to claim 1, further comprising a reading device configured to read an image from a document,
  wherein the predetermined image forming processing is copy processing in which image forming is performed based on the read image.

6. The image forming apparatus according to claim 1, wherein the predetermined image forming processing is printing processing in which image forming is performed based on received print data.

7. The image forming apparatus according to claim 1 wherein the second user instruction is a user instruction to execute the condensation removal when the temperature information output by the sensor is less than or equal to a predetermined value as the predetermined condition.

8. The image forming apparatus according to claim 1, wherein the fan is driven at a rotation speed greater than or equal to a predetermined value during the predetermined period.

9. The image forming apparatus according to claim 1 wherein the temperature information is output at a first interval when the image forming apparatus is in a first power mode, and the temperature information is output at a second interval when the image forming apparatus is in a a second power mode.

10. A method of controlling an image forming apparatus including an image forming device configured to execute an image forming processing, a fan, one or more controllers, and a temperature sensor, the method comprising:
  outputting temperature information;
    executing, by the one or more controllers, a condensation removal process that prohibits execution of a predetermined image forming processing and driving the fan for a predetermined period;
  receiving, by a reception device, as a user instruction from a user to decide timing to start the condensation removal process, a first user instruction from the user to execute the condensation removal process when the first user instruction is received and a second user instruction from the user to execute the condensation removal when the temperature information satisfies a predetermined condition.

11. A non-transitory storage medium storing a program for causing a computer of an image forming apparatus including an image forming device configured to execute an image forming processing, a fan, one or more controllers, and a temperature sensor to execute a method, the method comprising:
  outputting temperature information;
  executing, by the one or more controllers, a condensation removal process that prohibits execution of a predetermined image forming processing and driving the fan for a predetermined period,
  receiving, by a reception device as a user instruction from a user to decide timing to start the condensation removal process, a first user instruction from the user to execute the condensation removal process when the first user instruction is received and a second user instruction from the user to execute the condensation removal when the temperature information satisfies a predetermined condition.

\* \* \* \* \*